United States Patent
Parkinson et al.

(10) Patent No.: US 12,482,097 B2
(45) Date of Patent: Nov. 25, 2025

(54) SYSTEMS AND METHODS FOR IDENTIFYING CANCER IN PETS

(71) Applicant: MARS, INCORPORATED, McLean, VA (US)

(72) Inventors: Mark Justin Parkinson, Newark, NJ (US); Michael Fitzke, Verden (DE); Vladimir Fadeev, Stupino (RU); Fernando Rodrigues, Jr., Guararema (BR)

(73) Assignee: MARS, INCORPORATED, McLean, VA (US)

(*) Notice: Subject to any disclaimer, the term of this patent is extended or adjusted under 35 U.S.C. 154(b) by 348 days.

(21) Appl. No.: 18/256,312

(22) PCT Filed: Dec. 15, 2021

(86) PCT No.: PCT/US2021/063606
§ 371 (c)(1),
(2) Date: Jun. 7, 2023

(87) PCT Pub. No.: WO2022/132966
PCT Pub. Date: Jun. 23, 2022

(65) Prior Publication Data
US 2024/0331139 A1    Oct. 3, 2024

Related U.S. Application Data

(60) Provisional application No. 63/233,674, filed on Aug. 16, 2021, provisional application No. 63/153,308, (Continued)

(51) Int. Cl.
*G06V 20/69*    (2022.01)
*G06T 5/30*    (2006.01)
(Continued)

(52) U.S. Cl.
CPC .............. *G06T 7/0012* (2013.01); *G06T 5/30* (2013.01); *G06T 7/11* (2017.01); *G06V 10/82* (2022.01);
(Continued)

(58) Field of Classification Search
CPC .......... G06N 3/044; G06N 3/045; G06N 3/08; G06N 20/00; G06T 2207/10056;
(Continued)

(56) References Cited

U.S. PATENT DOCUMENTS 2,737,883 A * 3/1956 Crawford, Jr. ............. B41J 3/00
                                                        101/93.33
10,755,413 B1   8/2020 Putha et al.
(Continued)

FOREIGN PATENT DOCUMENTS

CN         110909756 A        3/2020
WO     WO 2020/243090 A1    12/2020

OTHER PUBLICATIONS

Arsomngern et al., "Computer-Aided Diagnosis for Lung Lesion in Companion Animals from X-ray Images Using Deep Learning Techniques," 2019 IEEE 10TH International Conference On Awareness Science And Technology (ICAST), Oct. 23, 2019, pp. 1-6.
(Continued)

*Primary Examiner* — Tsung Yin Tsai
(74) *Attorney, Agent, or Firm* — Baker Botts L.L.P.

(57) ABSTRACT

In one embodiment, the disclosure provides a method comprising: receiving an image of a biopsy slide; executing first programmed instructions to input the image to a first trained machine learning model programmed as a cancer classifier, thereby outputting a classification; determining, based on the classification, that the image should be further processed; executing a tissue detect ion algorithm on the image of the biopsy slide, thereby outputting a first set of coordi-
(Continued)

nates; executing second programmed instructions to input the image of the biopsy slide and the first set of coordinates to a second trained machine learning model programmed for image segmentation, thereby outputting a binary pixel mask; executing third programmed instructions to generate an enhanced pixel mask using the binary pixel mask; and digitally storing, in computer memory, a second set of coordinates indicated by the enhanced pixel mask, in one embodiment, a 10-high-power field can be generated and digitally stored.

20 Claims, 10 Drawing Sheets

Related U.S. Application Data filed on Feb. 24, 2021, provisional application No. 63/125,926, filed on Dec. 15, 2020.

(51) Int. Cl.
    *G06T 7/00*           (2017.01)
    *G06T 7/11*           (2017.01)
    *G06V 10/82*         (2022.01)

(52) U.S. Cl.
    CPC .......... *G06V 20/695* (2022.01); *G06V 20/698* (2022.01); *G06T 2207/10056* (2013.01); *G06T 2207/20081* (2013.01); *G06T 2207/20084* (2013.01); *G06T 2207/30024* (2013.01); *G06T 2207/30096* (2013.01)

(58) Field of Classification Search
    CPC . G06T 2207/20081; G06T 2207/20084; G06T 2207/30024; G06T 2207/30096; G06T 5/30; G06T 7/0012; G06T 7/11; G06V 10/82; G06V 20/695; G06V 20/698; G06V 2201/03
    See application file for complete search history.

(56) References Cited

U.S. PATENT DOCUMENTS

| | | |
|---|---|---|
| 2001/0041347 A1 | 11/2001 | Sammak et al. |
| 2013/0089248 A1 | 4/2013 | Remiszewski et al. |
| 2014/0030757 A1 | 1/2014 | Schifenbauer |
| 2017/0161891 A1 | 6/2017 | Madabhushi et al. |
| 2018/0322660 A1 | 11/2018 | Smith |
| 2019/0015059 A1 | 1/2019 | Itu et al. |
| 2019/0099409 A1 | 4/2019 | Baur et al. |
| 2019/0130562 A1 | 5/2019 | Liu et al. |
| 2020/0074146 A1 | 3/2020 | Prabhudesai |
| 2020/0177373 A1 | 6/2020 | Komandur et al. |
| 2020/0211695 A1 | 7/2020 | Zheng et al. |
| 2020/0372635 A1 | 11/2020 | Veidman et al. |
| 2021/0270722 A1* | 9/2021 | Chou ..................... G16H 40/60 |
| 2022/0222825 A1* | 7/2022 | Yaacobi ................ G06T 3/4007 |
| 2023/0230231 A1* | 7/2023 | Tu ........................ G06V 10/774 |
| | | 382/130 |

OTHER PUBLICATIONS

Bentley, "Multidimensional Binary Search Trees Used for Associative Searching," Communications of the ACM, Association for Computing Machinery, Inc., 18(9):509-517 (1975).
Extended European Search Report dated Oct. 8, 2024 in Application No. EP 21907745.
Extended European Search Report dated Sep. 27, 2024 in Application No. EP 21907744.
Kalra et al., "Pan-Cancer Diagnostic Consensus Through Searching Archival Histopathology Images Using Artificial Intelligence," ARXIV. org, Cornell University Library, Nov. 20, 2019, 21 pgs.
Myronenko et al., "3D MRI Brain Tumor Segmentation Using Autoencoder Regularization," Jan. 26, 2019, pp. 311-320.
Wahab et al., "Multifaceted fused-CNN based scoring of breast cancer whole-slide histopathology images," Applied Soft Computing Journal, 97:106808 (2020) 12 pgs.
Xie et al., "Self-Training With Noisy Student Improves ImageNet Classification," 2020 IEEE/CVF Conference On Computer Vision And Pattern Recognition (CVPR), pp. 10684-10695 (2020).
Cabrera et al. "A System for Segmentation and Bi-Level Cell Tracking," International Journal of Bioscience, Biochemistry and Bioinformatics, vol. 2, No. 4 [online], pp. 254-258, Jul. 4, 2012.
Fitzke et al. "OncoPetNet: A Deep Learning based AI system for mitotic figure counting on H&E stained whole slide digital images in a large veterinary diagnostic lab setting," Mars Digital Technologies et al. [online], pp. 1-24, Aug. 2021.
International Search Report mailed Mar. 4, 2022 in International Application No. PCT/US2021/063606.

* cited by examiner

| Category | Train | Validation | Image Example |
|---|---|---|---|
| (Count) | 1271 | 317 | |
| (No-Count) Lipomas | 703 | 176 | |
| (No-Count) Non-neoplastic lesions | 400 | 100 | |
| (No-Count) Skin punch biopsies | 180 | 45 | |
| (No-Count) Skin&subcutaneous tissues | 522 | 131 | |

*FIG. 3*

SYSTEMS AND METHODS FOR IDENTIFYING CANCER IN PETS

CROSS-REFERENCE TO RELATED APPLICATIONS

This application is a U.S. National Stage Patent Application under 35 U.S.C. § 371 of International Patent Application No. PCT/US2021/063606, filed on Dec. 15, 2021, which claims the benefit under 35 U.S.C. § 119 of provisional application 63/233,674, filed Aug. 16, 2021, provisional application 63/153,308, filed Feb. 24, 2021, and provisional application 63/125,926, filed Dec. 15, 2020, the entire contents of which are hereby incorporated by reference for all purposes as if fully set forth herein.

TECHNICAL FIELD

This disclosure generally relates to machine learning systems for identifying cancer from digital images of animal tissue.

BACKGROUND

One method of quantifying the aggressiveness of a cancer in an animal or a pet is to count the number of cells undergoing mitosis in a given area of the body during a given time. The mitotic count can play a role in traditional grading schemes, such as those for canine mast cell tumors, canine soft tissue sarcomas, canine melanocytic tumors, canine and feline mammary tumors, and others. An increased density of mitotic cells in a given area of the body can indicate cancer or other maladies affecting the animal, for example, it can indicate whether a detected neoplasm is benign or malignant or provide valuable prognostic information to a practitioner. However, the current process for determining increased density of mitotic cells involves reviewing a medical image of a given area of the animal or pet, and manually identifying any area of concern. This review process can be tedious, time consuming, and suffers from various inaccuracies or interobserver variation. Observing the density of mitotic cells can be difficult, at least in part, because the area of concern can be much smaller than the overall image being viewed. Further, the poor resolution of the specific mitotic area of the image can provide an additional complication. Different observers, even those who have been trained in similar methods, can come to different conclusions when reviewing the same image, resulting in inconsistent application and variation between different observers. The subjective nature of these observations can result in errors and reduces the overall efficiency of mitotic counting.

As a result, there is a need to provide more consistent, efficient, and objective mitotic counts, and to automate the processes for analyzing medical images of various resolutions and sizes to produces clinically reliant determinations of mitotic cells.

SUMMARY OF PARTICULAR EMBODIMENTS

Certain non-limiting embodiments provide systems, methods, media and combinations thereof for using machine learning systems to identify cancer. For example, digital biopsy images, such as tiled SVS format images, often used by medical scanning devices, or any other digital imaging and communications in medicine (DICOM) images, are processed using one or more machine learning models or tools. The machine learning model or tool, for example, can be a K-nearest neighbor (KNN), naïve Bayes (NB), decision trees or random forests, support vector machine (SVM), a deep learning model, such as convolutional neural network (CNN), region-based CNN (RCNN), one-dimensional (1-D) CNN, recurrent neural networks (RNNs), or any other machine learning model or technique. The machine learning model or tool can be trained to identify relevant images or slides and identify mitotic cells shown within the slides.

Certain non-limiting embodiments can be directed to a method. The method can include one or more of: receiving an image of a biopsy slide at a computing device; executing first programmed instructions to input the image of the biopsy slide to a first trained machine learning model programmed as a cancer classifier, thereby outputting a classification of the image of the biopsy slide; determining, based on the classification, that the image of the biopsy slide should be further processed; executing a tissue detection algorithm on the image of the biopsy slide, thereby outputting a first set of coordinates; executing second programmed instructions to input the image of the biopsy slide and the first set of coordinates to a second trained machine learning model programmed for image segmentation, thereby outputting a binary pixel mask; executing third programmed instructions to generate an enhanced pixel mask using the binary pixel mask; and digitally storing, in computer memory, a second set of coordinates indicated by the enhanced pixel mask.

One embodiment comprises executing fourth programmed instructions implementing a KD-tree based algorithm to output a field with the most mitotic figures based on the enhanced pixel mask; and digitally storing the field in the computer memory in a file with the second set of coordinates.

In one embodiment, the field comprises a 10-high-power field.

One embodiment comprises displaying the field on a device display.

In one embodiment, the tissue detection algorithm comprises performing coarse tissue segmentation on a low-resolution view of the slide image of the biopsy.

In one embodiment, the third programmed instructions are programmed to: cause determining, for every connected set of coordinates of the binary pixel mask indicating a mitotic figure, a corresponding rotated rectangle, each rotated rectangle being of a minimum area enclosing an approximated contour of the mitotic figure; and cause generating the enhanced pixel mask to include only coordinates associated with rotated rectangles having a respective width greater than a threshold width digitally stored in the computer memory.

In one embodiment, the third programmed instructions are further programmed to cause dilating the binary pixel mask with a number of repeated dilation iterations proportional to a kernel size and a mitotic cells inter-polar distance stored in the computer memory.

In one embodiment, the second trained machine learning model comprises a convolutional neural network with skip-connections that was trained to minimize at least one of a balanced-cross-entropy (BCE) soft-Dice-Loss function or a soft-Dice-Loss function.

In one embodiment, the second trained machine learning model further comprises a U-Net model that was pre-trained with ImageNet.

In one embodiment, the image of the biopsy slide comprises an image of a biopsy of at least one of an animal or a pet, and wherein the image of the biopsy was generated using a medical imaging device.

In one embodiment, the image of the biopsy slide comprises a whole slide image (WSI).

One embodiment comprises displaying an output image comprising a representation of the image of the biopsy slide and the classification.

One embodiment comprises programmatically pre-processing the image of the biopsy slide, wherein said pre-processing comprises determining that image of the biopsy slide is clear enough for further processing.

In one embodiment, the image of the biopsy slide comprises a whole slide image, and the pre-processing comprises at least one of determining that the resolution of the image of the biopsy slide exceeds a threshold resolution stored in the computer memory or determining that a number of slide images comprised by the whole slide image exceeds a threshold number stored in the computer memory.

One embodiment comprises: programmatically calculating a mitotic figure count using the second set of coordinates; and digitally storing the mitotic figure count in the computer memory.

In one embodiment, the computing device comprises a server computer, and the image of the biopsy slide is received from a client computing device.

In one embodiment, the file comprises an extensible markup language (XML) file.

One embodiment comprises transmitting, from the server computer to the client computing device, information about the biopsy slide image as annotations that are rendered from the extensible markup language (XML) file.

One embodiment comprises executing a method using a distributed, decentralized, and asynchronous architecture comprising scalable blocks, the scalable blocks comprising management programs, and the management programs being implemented using docker containers.

Certain non-limiting embodiments can be directed to computer-readable non-transitory storage media comprising instructions operable when executed by one or more processors to cause a system to perform any of the methods or techniques described herein.

Certain non-limiting embodiments can be directed to a system, which can include one or more processors, one or more computer-readable non-transitory storage media coupled to one or more of the processors and comprising instructions operable when executed by one or more of the processors to cause the system to perform any of the methods or techniques described herein.

Certain non-limiting embodiments can be directed to a system architecture for using the disclosed systems and methods in a clinical setting. For example, in particular embodiments, one or more pre-process steps and/or post-process steps can be utilized to increase resource efficiency. These steps can be executed by system architecture leveraging a pull-based asynchronous architecture, which can add new scans to a processing queue as they become available throughout a specified time period.

The embodiments disclosed herein are only examples, and the scope of this disclosure is not limited to them. Certain non-limiting embodiments can include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed includes not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a more complete understanding of the present disclosure and its features and advantages, reference is now made to the following description, to be understood in conjunction with the accompanying drawings. In the drawings:

FIG. 3 illustrates an example set of biopsy slide classification data and categories.

DESCRIPTION OF EXAMPLE EMBODIMENTS

Figure 1:
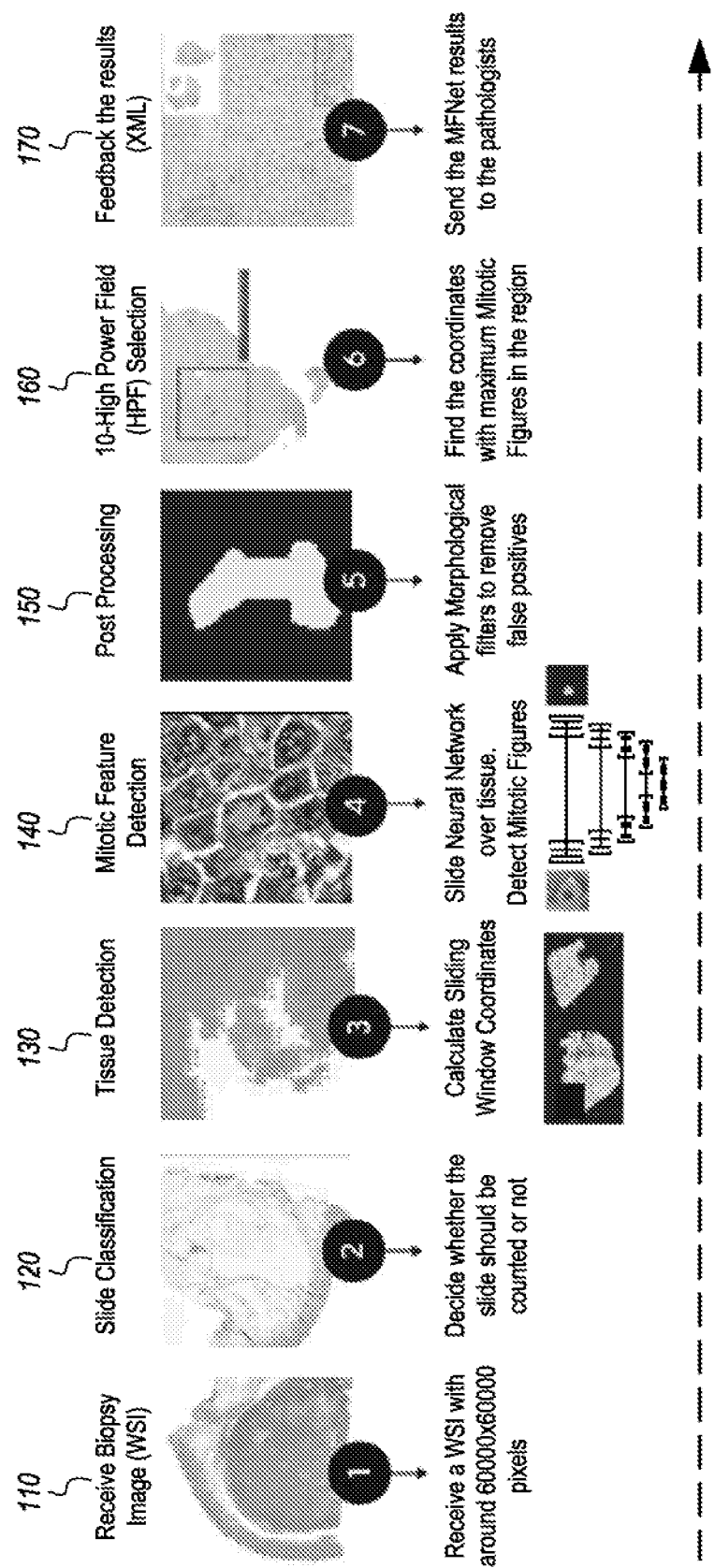
FIG. 1 illustrates an example seven step framework for evaluating mitotic figures for identifying cancer.

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

As used herein, the terms "animal" or "pet" as used in accordance with the present disclosure refers to domestic animals including, but not limited to, domestic dogs, domestic cats, horses, cows, ferrets, rabbits, pigs, rats, mice, gerbils, hamsters, goats, and the like. Domestic dogs and domestic cats are particular non-limiting examples of pets. The term "animal" or "pet" as used in accordance with the present disclosure can further refer to wild animals where appropriate, including, but not limited to bison, elk, deer, venison, duck, fowl, fish, and the like.

As used herein, the "feature" of the image or slide can be determined based on one or more measurable characteristics of the image or slide. For example, a feature can be a dense area of tissue detected in a biopsy image.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "device" refers to a computing system or mobile device. For example, the term "device" can include a smartphone, a tablet computer, or a laptop computer. In particular, the computing system can include functionality for determining its location, direction, or orientation, such as a GPS receiver, compass, gyroscope, or accelerometer. Client device can also include functionality for wireless communication, such as BLUETOOTH communication, near-field communication (NFC), or infrared (IR) communication or communication with wireless local area networks (WLANs) or cellular-telephone network. Such a device can also include one or more cameras, scanners, touchscreens, microphones, or speakers. Client devices can also execute software applications, such as games, web browsers, or social-networking applications. Client devices, for example, can include user equipment, smartphones, tablet computers, laptop computers, desktop computers, or smartwatches.

Example processes and embodiments can be conducted or performed by a computing system or client device through a mobile application and an associated graphical user interface ("UX" or "GUI"). In certain non-limiting embodiments, the computing system or client device can be, for example, a mobile computing system-such as a smartphone, tablet computer, or laptop computer. This mobile computing system can include functionality for determining its location, direction, or orientation, such as a GPS receiver, compass, gyroscope, or accelerometer. Such a device can also include functionality for wireless communication, such as BLUETOOTH communication, near-field communication (NFC), or infrared (IR) communication or communication with wireless local area networks (WLANs), 3G, 4G, LTE, LTE-A, 5G, Internet of Things, or cellular-telephone network. Such a device can also include one or more cameras, scanners, touchscreens, microphones, or speakers. Mobile computing systems can also execute software applications, such as games, web browsers, or social-networking applications. With social-networking applications, users can connect, communicate, and share information with other users in their social networks.

Generally, mitotic figure counting involves the identification of a site having the most mitotic activity across a plurality of slide sections of a tumor (or similar body). Due to the size of pathology samples (including, in certain example embodiments, up to 20 slides per tumor) site selection can be a time-consuming process. After the site is selected, further time and effort is required to quantitatively assess the number of mitotic figures, especially in regions with high mitotic activity. Inefficiencies caused by interobserver variation and subjective determinations in both of these steps reduce the accuracy of resultant mitotic figure counts and waste valuable diagnosis and treatment time.

The automation of histopathology analysis tools provides the potential for practice-based efficiencies, as it would allow for the objective determination of mitotic figure counts without errors that can be caused by the subjective determination of the individual observers.

FIG. 1 illustrates an example seven-step process framework for evaluating mitotic figures for identifying cancer. The identifying can include determining or diagnosing. In particular, the process illustrated in FIG. 1 includes seven steps used to identify a mitotic cell, or an area including a mitotic cell, in a given image. While the process illustrated in FIG. 1 utilizes seven steps, other embodiments can use one or more of the steps identified in FIG. 1, and the steps can be done in the listed order or any other order, as well as any other step known to a person of skill in the art. In an embodiment, all seven steps are computer-implemented using one or more stored instruction programs, methods, functions, or other software elements, as further described in other sections herein.

Figure 6:
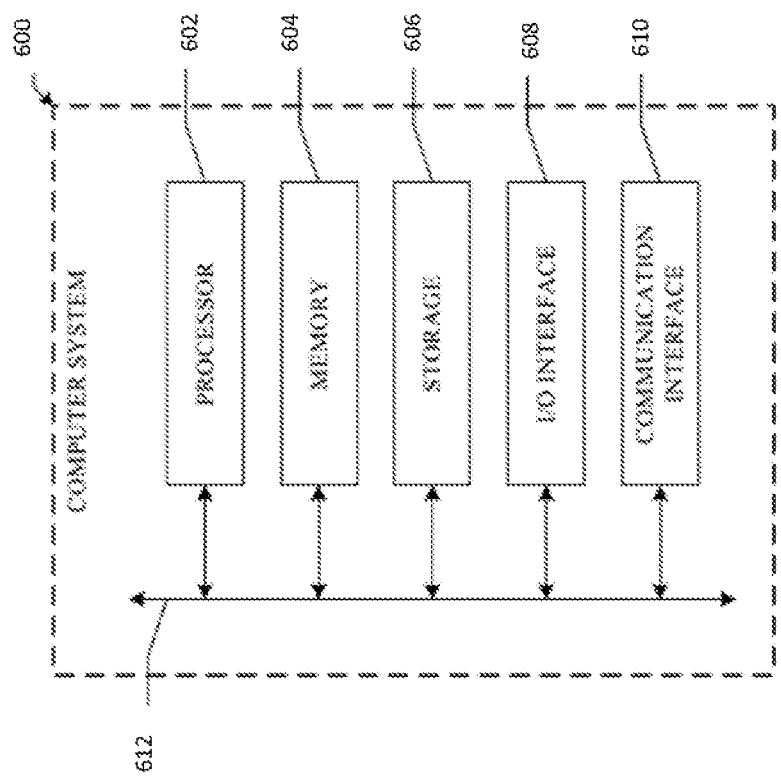
FIG. 6 illustrates an example computer system or device used to facilitate diagnosis of cancer using machine learning tools, according to certain non-limiting embodiments.

At first step 110, a computer system, which can include the computer components as shown in FIG. 6, as well as other components which can adequately receive and process the images, receives a biopsy image that has been digitally stored. In some embodiments, each biopsy image is a whole slide image ("WSI") that has been obtained from tissue collected in a biopsy and digital imaging, scanning, or photography. The biopsy image can include one or more slide images from a medical imaging device. The slide images can have various resolutions, for example 200,000× 200,000 pixels or smaller. In other non-limiting embodiments, first step 110 can involve receiving one or more of any other digital imaging and communications in medicine (DICOM) image(s). The image can be received from a server, such a cloud server, or from any other computing or client device on the network, using database queries to an image store, programmatic calls to an API, receiving a network pathname of a folder or directory that contains images followed by iterative opening of the files, or other programmatic techniques. The image can be taken by any known medical imaging device.

At second step 120, the method is programmed to classify each slide within the biopsy image. The classification of step 120 can determine, for example, whether or not a slide should be considered a part of the analysis based on whether or not the slide has cancerous cells or is clear enough for analysis of mitotic figures to be performed. With classification at step 120, slides that do not have cancerous cells can be filtered out of the analysis at a preliminary step and prevented from being subject to further analysis. Thus, in one embodiment, step 120 comprises determining that a slide has a high likelihood to contain cancer based on its classification and sending the slide for further processing based on that determination. Further, classification at step 120 can help to reduce the workload of the system by removing or eliminating those slides that do not need to proceed through steps 130, 140, 150, 160, 170. In other non-limiting embodiments, in second step 120 any other characteristic of the slide can be evaluated, including the resolution of the slide and/or the number of slide images contained within a given WSI. Slides that do not meet basic threshold criteria can be rejected; values for the criteria can be digitally stored in a configuration file, received via user input, or hard-coded as declared constants or fixed values, in certain embodiments, the classification model can be trained using a CNN. For example, a pre-trained (such as ImageNet) residual neural network (ResNet) architecture can be used for feature extraction on the digital biopsy images, followed by a fully connected layer and a softmax activation function that can be used to determine the probability of the slide having cancerous cells. In certain embodiments, an 18-layers-deep ResNet-18 architecture can be used.

At third step 130, the method is programmed to calculate sliding window coordinates in the WSI. As a result of the large size of the biopsy images and/or potential memory limitations of a system implementing the process framework of FIG. 1, only a portion of all the data associated with each slide can be examined at once, using a sliding window of data. A sliding window of data can be a subset of data of the complete slide, programmed to have a size which the system can observe and process in main memory at a given period of time. In some non-limiting embodiments, the sliding window can be determined by initially identifying tissue located within the slide image. The tissue, for example, can be identified by detecting contrast in the image between the tissue and a general background; contrast detection can distinguish, for example, a bright white background produced by backlit glass. The identification and/or separation of the tissue from the general background can be referred to as tissue segmentation. Detecting contrast in this manner can improve efficiency by rapidly converging the method on windows of data that are likely to produce useful substantive results rather than representing noise.

At fourth step 140, the method is programmed to evaluate data in each of the identified sliding windows. Once the method has evaluated each of the sliding windows, the method is programmed to identify potential mitotic cells within a particular window. The identified mitotic cells can be highlighted in a copy of the image that is displayed to the user using a display device of a user computing device and/or sent to step 150. In certain non-limiting embodiments, a deep learning network can be used to execute data evaluation at step 140. For example, a CNN can be used with architectures and techniques including a U-Net and/or a skip-connection. The U-Net can be utilized with other techniques including but not limited to BatchNorm, Dice-Loss, Tversky loss, Mixup, Architecture Changes, Image Patching, GAN-Training, Bilinear Upsampling, and/or Residual ConvBlocks. Other machine learning models, techniques, or architectures can incorporate one or more of hard negative mining, aggressive augmentation, mixing losses, ensembling, masking, re-sizing, and/or segmentation. The system uses one or more such techniques to identify potential mitotic figures.

In certain non-limiting embodiments, a deep learning network can include a CNN following a U-Net. The deep learning network, for example, can be trained so as to minimize the following loss function:

$$\alpha \cdot \mathcal{L}(\theta, \mathcal{D}_{150}) + (1-\alpha) \cdot \mathcal{L}(\theta, \mathcal{D}_{600})$$

where $\mathcal{L}$ represents a loss function, $\alpha$ represents a hyper parameter ranging from $\in [0,1]$, $\mathcal{D}_{150}$ represents an image pixilation of 150×150 pixels, and $\mathcal{D}_{600}$ represents an image pixilation of 600×600 pixels. In some non-limiting examples, $\mathcal{L}$ be set as BCE-soft-Dice-Loss trained on 50 epochs and/or soft Dice Loss trained on 100 epochs. In certain non-limiting embodiments, $\mathcal{L}$ set as BCE-soft-Dice-Loss for a number of epochs and then on soft Dice Loss for additional epochs in training the model.

At fifth step 150, the method is programmed to execute a post-processing stage in which false positives can be removed from the initial output data. The false positives can be determined using a machine learning model trained with one or more sets of labeled training data. These sets of labeled training data can be a plurality of images of biopsy slides and a plurality of respectively associated ground truth labels or annotations. An example relationship represented in the training data can be that dense tissue indicates mitotic cells. This relationship can be represented in training data comprising a specified set of digital images that have been manually labeled or labeled using a separate trained machine learning model. Model training is explained herein with greater specificity. In certain non-limiting embodiments, negative training data in the form of a mask can be used in the method to identify when a potential aggregation of one or more mitotic cell has been mis-identified or counted twice.

At sixth step 160, the method is programmed to determine all the coordinates of the pixels representing mitotic figures and to count the mitotic figures. The mitotic figures can be counted as explained herein with more specificity. The coordinates of all the pixels of the mitotic figures can be digitally stored. Additionally, a field with the most mitotic figures, such as a 10-high-power field subregion can be determined and digitally stored.

At seventh step 170, the results can be sent to pathologist or others for further analysis or interpretation. The results can then be displayed on a computing device on the network and/or viewed by a pathologist or any other interested party. Additional information regarding the analysis and interpretation can also be included.

Figure 2:
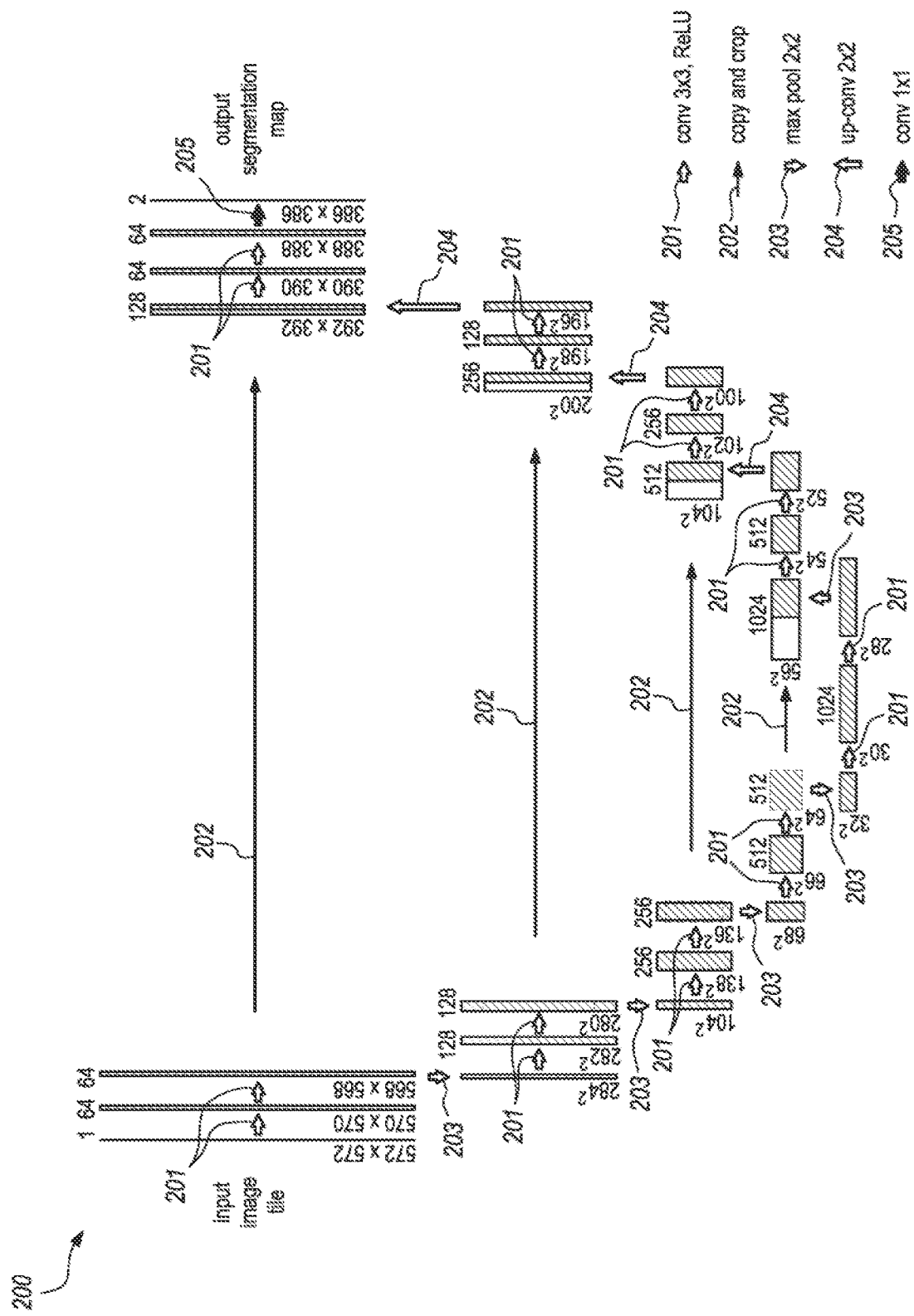
FIG. 2 illustrates an example machine learning model according to certain embodiments.

FIG. 2 illustrates a non-limiting embodiment of a machine learning model that can be used to compare images or sliding windows of image data of anatomical structures having different shapes, sizes, and/or orientation. The training dataset used to train the machine learning model can include a plurality of images having different shapes, sizes, and/or orientations to train the machine learning model to flip, rotate, and reshape the image to allow for proper assessment and comparison. In the example of FIG. 2, the machine learning model uses a U-Net architecture 200. A U-Net architecture 200 comprises a specific encoder-decoder scheme using layers. The encoder reduces the spatial dimensions and increases the channels. The decoder increases the spatial dimensions and reduces the channels. In the end, the spatial dimensions can be restored to make a prediction for each pixel in the input image.

The example U-Net 200 depicted in FIG. 2 follows a symmetric architecture. The encoder (on the left side) consists of repeated 3×3 convolution blocks 201. Each convolution can be followed by a ReLU and batch normalization. The 3×3 convolution blocks 201 can be followed by 2×2 max pooling blocks 203 which reduce the spatial dimensions. The decoder (on the right side) comprises upsampling and 2×2 transpose convolution blocks 204, which halve the number of feature channels. Each of these upsampling blocks 204 can be followed by repeated 3×3 convolution blocks 201 (each followed by a ReLU). At the final layer, a 1×1 convolution 205 can be used to map the channels to the desired number of classes. Notably, the depicted U-Net 200 also includes "copy and crop" blocks 202 that can be necessary due to the loss of border pixels in every convolution.

In particular embodiments, the U-Net 200 can be utilized with other techniques including but not limited to BatchNorm, DiceLoss, Tversky loss, Mixup, Architecture Changes, Image Patching, GAN-Training, Bilinear Upsampling, and/or Residual ConvBlocks.

In some non-limiting embodiments, the machine learning framework can include a convolutional neural network (CNN) component trained from collected training data from a plurality of images and corresponding quality and classification values. The collected training data, for example, can be one or more images captured by a client device. A CNN is a type of artificial neural network comprising one or more convolutional and subsampling layers with one or more nodes. One or more layers, including one or more hidden layers, can be stacked to form a CNN architecture. In embodiments, a CNN is configured to learn to determine image parameters and subsequent classification and quality of input images by being exposed to large volumes of labeled training data. While in some examples a neural network can train a learned weight for every input-output pair, CNNs also can convolve trainable fixed-length kernels or filters along their inputs to learn to recognize small, primitive features and combine them in complex ways. The CNN of FIG. 2 when trained on a synthetic dataset of a particular labelled images allow for accurate object segmentation and image feature classification and prediction of possible features in real images. The CNN can be supervised or non-supervised.

In certain non-limiting embodiments, pooling, padding, and/or striding can be used to reduce the size of the output of the CNN of FIG. 2 in the dimensions that the convolution is performed, thereby reducing computational cost and/or making overtraining less likely. Striding can describe a size or number of steps with which a filter window slides, while padding can include filling in some areas of the data with zeros to buffer the data before or after striding. Pooling, for example, can include simplifying the information collected by a convolutional layer, or any other layer, and creating a condensed version of the information contained within the layers.

In some examples, a region-based CNN (RCNN) or a one-dimensional (1-D) CNN can be used. RCNN includes using a selective search to identify one or more regions of interest in an image and extracting features from each region of interest independently for classification. Types of RCNN employed in one or more embodiments can include Fast RCNN, Faster RCNN, or Mask RCNN. In other examples, a 1-D CNN can process fixed-length time series segments produced with sliding windows. Such 1-D CNN can run in a many-to-one configuration that utilizes pooling and striding to concatenate the output of the final CNN layer. A fully connected layer can then be used to produce a class prediction at one or more time steps.

As opposed to 1-D CNNs that convolve fixed-length kernels along an input signal, recurrent neural networks (RNNs) process each time step sequentially, so that an RNN layer's final output is a function of every preceding timestep.

In certain embodiments, an RNN variant known as long short-term memory (LSTM) model can be used. LSTM can include a memory cell and/or one or more control gates to model time dependencies in long sequences. In some examples the LSTM model can be unidirectional, meaning that the model processes the time series in the order it was recorded or received. In another example, if the entire input sequence is available, two parallel LSTM models can be evaluated in opposite directions, both forwards and backwards in time. The results of the two parallel LSTM models can be concatenated, forming a bidirectional LSTM (bi-LSTM) that can model temporal dependencies in both directions.

In some embodiments, one or more CNN models and one or more LSTM models can be combined. The combined model can include a stack of four unstrided CNN layers, which can be followed by two LSTM layers and a softmax classifier. A softmax classifier can normalize a probability distribution that includes a number of probabilities proportional to the exponentials of the input. The input signals to the CNNs, for example, are not padded, so that even though the layers are unstrided, each CNN layer shortens the time series by several samples. The LSTM layers are unidirectional, and so the softmax classification corresponding to the final LSTM output can be used in training and evaluation, as well as in reassembling the output time series from the sliding window segments. The combined model though can operate in a many-to-one configuration.

In some embodiments, transformer-based models can be utilized to identify the features of relevance in the image segments. These can additionally be combined with other networks such as CNNs.

In some embodiments, the machine learning model of FIG. 2 can be trained using a plurality of previously verified data through a plurality of phases. Training can occur in two phases, which use two types of training data. In the first phase, slide classification data can be collected, and the machine learning model can be trained to classify whether or not slides should be counted for mitotic figures. In the second phase, mitotic figure data can be collected, either automatically or through the use of board-certified anatomic pathologists and other experts.

FIG. 3 illustrates an example set of biopsy slide classification data and categories. In certain example embodiments, a plurality of WSIs can be collected and analyzed, either manually or by a computer, to determine whether or not the slide image should be included in a mitotic figure counting process. Each of the collected slides can be categorized as either a count slide 310 or a no-count slide 320, wherein a count slide 310 can be further analyzed to detect or count mitotic figures, whereas a no-count slide 320 will not be further analyzed to count mitotic figures. In addition to being classified as a no-count slide 320, slides can be further categorized to include a reason for their being classified as no-count, such as including, in whole or in part, "lipomas," "non-neoplastic lesion," "skin punch biopsies" and/or "skin & subcutaneous tissues." The analyzed slides can be further split into two groups, a training group and a validation group, wherein the training group images are selected to train the machine learning model, while the validation group is used to validate (i.e. test) the machine learning model, or, alternatively, to validate the category assignment of the training group images.

In addition to categorization of slides, data can also be collected regarding mitotic figure labelling for use in training. Like slide classification, mitotic figure labelling can proceed manually, or alternatively, by a computer automatically. Further, these labelled figures can be used both to train a machine learning model and/or to test a previously trained model. In certain example embodiments, a first plurality of mitotic figures can be labelled on and/or across one or more WSIs. In one experiment, 54 mitotic figures were labeled across 11 WSIs. These identified mitotic figures can then be extracted as a plurality of image patches, each comprising approximately 150×150 pixels, centered on the mitotic figure for that respective patch. Each of these extracted image patches can then be used to train a first machine learning model, which can then identify a second plurality of mitotic figures on or across a plurality of WSIs. In one embodiment, the second plurality of mitotic figures was recognized across 74 WSIs. From this second plurality of mitotic figures, a subset can be sampled (either manually or through the use of a machine learning algorithm), and a second plurality of image patches prepared. This process can be repeated iteratively, until the machine learning model has been satisfactorily trained. In addition, image patches of varying sizes can be used, for example, 150×150 pixels, 600×600 pixels, and/or 1200×1200 pixels. These patches need not be square, nor does the mitotic figure need to be centered in each one.

Specific features of mitotic cells can be identified, corresponding with different stages of mitosis, which can be identified with the proper label. These stages can include: prophase (comprising a circular cluster of chromatin and rods); metaphase (comprising aligned chromosomes at the equator including a linear plate, band, and/or ring, with rods projecting from the surface); and anaphase (comprising two separate aggregates at variable distances apart, which are generally linear with spike projections). Additionally, telophase (comprising two separate aggregates at opposite ends of the cell with cleavage furrow located between them) can be detected using the morphological filter. As part of training the machine learning algorithm, the model can be trained to identify these different features and appropriately label the input image features, corresponding with each individual slide frame. The trained machine learning algorithm can also perform this analysis, after it has been trained on previously labelled images (per the above). In addition to automatic identification and labelling by the trained (or training) machine learning algorithm, mitotic figures can also be identified and labelled by qualified observers, such as board-certified anatomic pathologists. These manually labelled images and features can also be used to train the machine learning algorithm or, alternatively, to check the accuracy of a previously trained algorithm.

Additional training data can be developed by presenting images which have been annotated to indicate identified mitotic figures by a model (trained or training). An annotator, which could be either a researcher such as an anatomic pathologist, or a fully trained model, can then examine the annotated figure and apply an appropriate label. For example, if the identified mitotic figures are all correct, a label of "correct" can be added to the image. If the identified mitotic figures are all incorrect, a label of "incorrect" can be added to the image. If the identified mitotic figures were a mix of correct and incorrect, the figures can be annotated at this stage to include the portion of the image that contained the mitotic figure. A mask can then be applied to these marked images, as described herein in connection with FIG. 4. Once all images are reviewed and appropriately labelled, the data can be collected and added to a training set.

Figure 4:
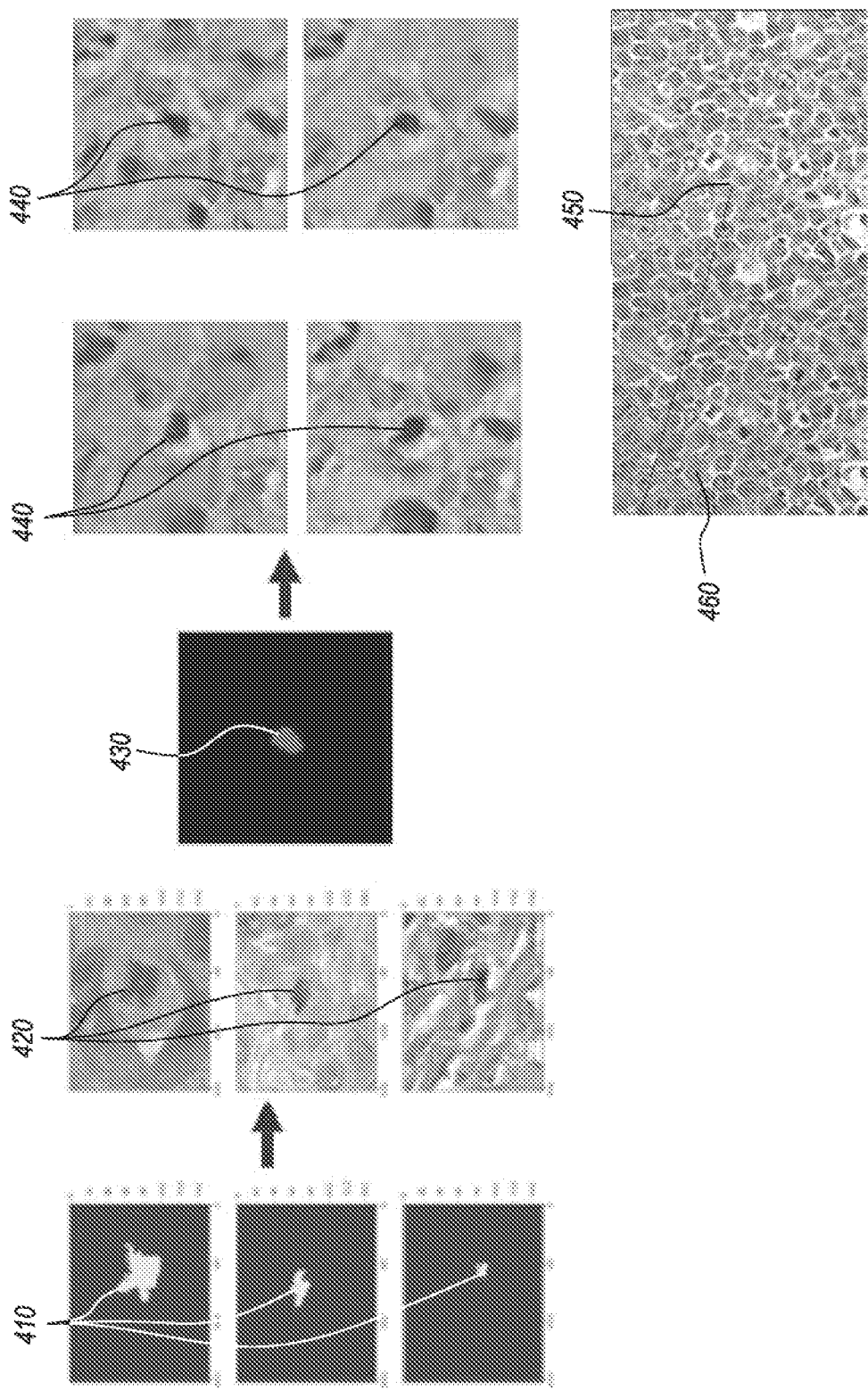
FIG. 4 illustrates example components of a machine learning model according to certain embodiments.

FIG. 4 illustrates example components of a machine learning model according to certain embodiments. In particular, FIG. 4 illustrates an example method of augmenting training data using generative adversarial networks ("GANs"). In this example method, one or more real mask features 410 having a specific shape and size can be compared to input images 420. In other words, in certain embodiments the machine learning tool can convert input images 420 to masked features 410, which can then be compared to other images of similar size and/or shape stored in the database. In certain other non-limiting embodiments, a single mask feature 430 can be compared to other images 440, even though the images 440 include dense tissue area of different orientation, size, and shape. Accordingly, images inputted by the machine learning tool can be adjusted or manipulated so that the images can be compared to images 440 having a different size, shape, and/or orientation. As a further alternative, the mask features 310, 330 can be used to generate synthetic data, either for training or testing. The mask can be applied to input images to generate an image having a mitotic figure, based on a transformation of one of the masks. As noted above, the mask features can also be manually applied by a pathologist (e.g. 450) or alternatively, a sample annotated image (e.g. 460) can be presented to a pathologist for further evaluation and/or verification.

Figure 5:
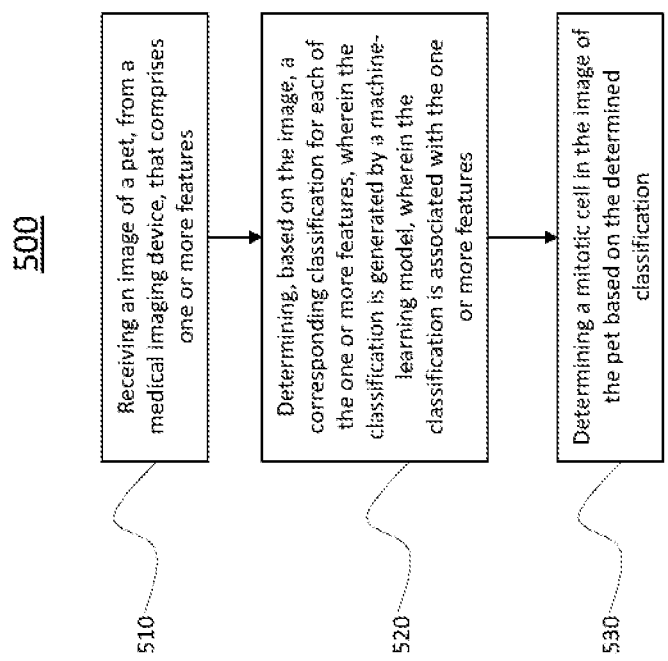
FIG. 5 illustrates an example method for using machine learning systems for identifying cancer.

FIG. 5 illustrates an example method 500 for using machine learning systems to identify cancer. The method can begin at a first step 510, where the system receives an image of a pet, from a medical imaging device, which includes one or more features. At a second step 520, the system can determine, based on the image, a corresponding classification for each of the one or more features, wherein the classification is generated by a machine-learning model, wherein the classification is associated with the one or more features. At a third step 530, the system can determine a mitotic cell in the image of the pet based on the determined classification. In accordance with the disclosed subject matter, the method can repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method identifying cancer including the particular steps of the method of FIG. 5, this disclosure contemplates any suitable method for identifying cancer including any suitable steps, which can include all, some, or none of the steps of the method of FIG. 5, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 5.

FIG. 6 illustrates an example computer system 600 used to facilitate mitotic cell identification using machine learning tools according to some non-limiting embodiments. In certain non-limiting embodiments, one or more computer systems 600 perform one or more steps of one or more methods described or illustrated herein. In certain other non-limiting embodiments, one or more computer systems 600 provide functionality described or illustrated herein. In certain non-limiting embodiments, software running on one or more computer systems 600 performs one or more steps of one or more methods described or illustrated herein or provides functionality described or illustrated herein. Some non-limiting embodiments include one or more portions of one or more computer systems 600. Herein, reference to a computer system can encompass a computing device, and vice versa, where appropriate. Moreover, reference to a computer system can encompass one or more computer systems, where appropriate.

This disclosure contemplates any suitable number of computer systems 600. This disclosure contemplates computer system 600 taking any suitable physical form. As example and not byway of limitation, computer system 600 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 can include one or more computer systems 600; be unitary or distributed; span multiple locations; span multiple machines; span multiple data centers; or reside in a cloud, which can include one or more cloud components in one or more networks. Where appropriate, one or more computer systems 600 can perform without substantial spatial or temporal limitation one or more steps of one or more methods described or illustrated herein. As an example, and not by way of limitation, one or more computer systems 600 can perform in real time or in batch mode one or more steps of one or more methods described or illustrated herein. One or more computer systems 600 can perform at different times or at different locations one or more steps of one or more methods described or illustrated herein, where appropriate.

In certain non-limiting embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In some non-limiting embodiments, processor 602 includes hardware for executing instructions, such as those making up a computer program. As an example and not by way of limitation, to execute instructions, processor 602 can retrieve (or fetch) the instructions from an internal register, an internal cache, memory 604, or storage 606; decode and execute them; and then write one or more results to an internal register, an internal cache, memory 604, or storage 606. In certain non-limiting embodiments, processor 602 can include one or more internal caches for data, instructions, or addresses. This disclosure contemplates processor 602 including any suitable number of any suitable internal caches, where appropriate. As an example and not by way of limitation, processor 602 can include one or more instruction caches, one or more data caches, and one or more translation lookaside buffers (TLBs). Instructions in the instruction caches can be copies of instructions in memory 604 or storage 606, and the instruction caches can speed up retrieval of those instructions by processor 602. Data in the data caches can be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches can speed up read or write operations by processor 602. The TLBs can speed up virtual-address translation for processor 602. In some non-limiting embodiments, processor 602 can include one or more internal registers for data, instructions, or addresses. This disclosure contemplates processor 602 including any suitable number of any suitable internal registers, where appropriate. Where appropriate, processor 602 can include one or more arithmetic logic units (ALUs); be a multi-core processor; or include one or more processors 602. Although this disclosure describes and illustrates a particular processor, this disclosure contemplates any suitable processor, in some non-limiting embodiments, memory 604 includes main memory for storing instructions for processor 602 to execute or data for processor 602 to operate on.

As an example, and not by way of limitation, computer system 600 can load instructions from storage 606 or another source (such as, for example, another computer system 600) to memory 604. Processor 602 can then load the instructions from memory 604 to an internal register or internal cache. To execute the instructions, processor 602 can retrieve the instructions from the internal register or internal cache and decode them. During or after execution of the instructions, processor 602 can write one or more results (which can be intermediate or final results) to the internal register or internal cache. Processor 602 can then write one or more of those results to memory 604. In some non-limiting embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which can each include an address bus and a data bus) can couple processor 602 to memory 604. Bus 612 can include one or more memory buses, as described below. In certain non-limiting embodiments, one or more memory management units (MMUs) reside between processor 602 and memory 604 and facilitate accesses to memory 604 requested by processor 602. In certain other non-limiting embodiments, memory 604 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 604 can include one or more memories 604, where appropriate. Although this disclosure describes and illustrates a particular memory component, this disclosure contemplates any suitable memory.

In some non-limiting embodiments, storage 606 includes mass storage for data or instructions. As an example and not by way of limitation, storage 606 can include a hard disk drive (HDD), a floppy disk drive, flash memory, an optical disc, a magneto-optical disc, magnetic tape, or a Universal Serial Bus (USB) drive or a combination of two or more of these. Storage 606 can include removable or non-removable (or fixed) media, where appropriate. Storage 606 can be internal or external to computer system 600, where appropriate. In certain non-limiting embodiments, storage 606 is non-volatile, solid-state memory. In some non-limiting embodiments, storage 606 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 can include one or more storage control units facilitating communication between processor 602 and storage 606, where appropriate. Where appropriate, storage 606 can include one or more storages 606. Although this disclosure describes and illustrates particular storage, this disclosure contemplates any suitable storage.

In certain non-limiting embodiments, I/O interface 608 includes hardware, software, or both, providing one or more interfaces for communication between computer system 600 and one or more L/O devices. Computer system 600 can include one or more of these I/O devices, where appropriate. One or more of these I/O devices can enable communication between a person and computer system 600. As an example and not by way of limitation, an I/O device can include a keyboard, keypad, microphone, monitor, mouse, printer, scanner, speaker, still camera, stylus, tablet, touch screen, trackball, video camera, another suitable 10 device or a combination of two or more of these. An I/O device can include one or more sensors. This disclosure contemplates any suitable I/O devices and any suitable I/O interfaces 608 for them. Where appropriate, I/O interface 608 can include one or more device or software drivers enabling processor 602 to drive one or more of these I/O devices. I/O interface 608 can include one or more I/O interfaces 608, where appropriate. Although this disclosure describes and illustrates a particular I/O interface, this disclosure contemplates any suitable I/O interface.

In some non-limiting embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 can include a network interface controller (NIC) or network adapter for communicating with an Ethernet or other wire-based network or a wireless NJC (WNIC) or wireless adapter for communicating with a wireless network, such as a WI-FI network. This disclosure contemplates any suitable network and any suitable communication interface 610 for it. As an example and not by way of limitation, computer system 600 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 600 can communicate with a wireless PAN (WPAN) (such as, for example, a BLUETOOTH WPAN), a WI-FI network, a WI-MAX network, a cellular telephone network (such as, for example, a Global System for Mobile Communications (GSM)network), or other suitable wireless network or a combination of two or more of these. Computer system 600 can include any suitable communication interface 610 for any of these networks, where appropriate. Communication interface 610 can include one or more communication interfaces 610, where appropriate. Although this disclosure describes and illustrates a particular communication interface, this disclosure contemplates any suitable communication interface.

In certain non-limiting embodiments, bus 612 includes hardware, software, or both coupling components of computer system 600 to each other. As an example and not by way of limitation, bus 612 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 can include one or more buses 612, where appropriate. Although this disclosure describes and illustrates a particular bus, this disclosure contemplates any suitable bus or interconnect.

Certain non-limiting embodiments are directed to a system architecture for using the disclosed systems and methods in a clinical setting. In such non-limiting embodiments, the one or more deep learning or models or machine learning models can be used to operate on one or more scans uploaded in real time. When resources in the system architecture are available, then one or more WSIs can be downloaded to the apparatus. The WSI, for example can include a thumbnail of 224×224 pixels. In some non-limiting embodiments, a Biopsy Slide Classification can be executed. If the Classifier returns "no-count" the process can be halted. If the Classifier returns "count" the next step can be performed. The next step can include executing a tissue detection algorithm. The tissue detection algorithm can detect the foreground and calculate one or more coordinates for the (model-based) mitotic figure detector. The algorithm, for example, can be a non-model-based algorithm. The mitotic figure detector model can be executed on all calculated coordinates. A pixel mask can then be predicted. At least one of thresholding and/or morphological filters can be applied to enhance predictive performance. These filters can remove any marked pixels that do not contain a mitotic filter by selecting images which do not include masks of an appropriate size, color, or shape.

In some non-limiting embodiments, a second non-model-based algorithm can be used to calculate coordinates of the mitotic figures from the enhanced pixel masks. A k-dimensional tree (KD-tree), which can be a space-partitioning, efficient binary tree data structure for organizing points in a k-dimensional space, can be used to find a subregion of the WSI with identified coordinates of mitotic cells, such as a 10-high-power field subregion. This subregion represents the highest concentration of mitotic cells in the WSI. In certain embodiments, the KD-tree within 2-dimensional search space can build a data structure in $O(n \log n)$ and can handle range reporting queries in $O(\sqrt{n}+k)$, wherein n can represent the total number of points and k can represent the number of reported points, each point referring to a unique mitotic cell center coordinate on a 2D plane of the WSI. Coordinates of the one or more mitotic figures and the 10-high-power field can be written into an extensible markup language (XML) file, or any other data file, and results written into a database. This particular second non-model-based algorithm recited herein generalizes across many search subregions shapes and sizes and is not limited by a square shape; it can find any subregion of highest concentration taking the shape bounded by the $L\hat{\ }p$-space's ball, where $L\hat{\ }p$ space is a vector space with a defined notion of the distance between given two points (e.g., p=2 is the Euclidean normed vector space). This algorithm can be used to identify highest mitosis concentration subregions enclosed in other shapes such as square shape [p equal to infinity], diamond shape [p equal to 1, and round shape (p equal to 2], etc. The recited algorithm generalizes as well to any size of highest mitotic concentration subregion (i.e., a number of high-power fields such 10, 20, or 50, and is bounded by available memory).

The models described herein can be integrated into a viewer workflow. The viewer, for example, can be a pathologist and/or any medical professional. A pathologist, for example, can receive information from one or more models as annotations that are rendered from the XML file. The XML file can be viewed using any known WSI viewer. Once received, the viewer can provide additional annotations. The annotations, for example, can annotate false positives and/or false negatives. The annotations made by the viewer can be stored in the database and can be used for fine tuning or training the detection model. The fine tuning or detection model can be performed based on a volume of the feedback or the annotations.

In certain non-limiting embodiments, non-model-based algorithms can be used at various stages to support the counting of mitotic figures. For example, tissue detection can be performed by coarse tissue segmentation on a low-resolution view of the WSI. The low-resolution image can be resized to match at least one of a mitotic figure detector's sliding window size and/or a high-resolution image size. The mitotic figure detector's sliding window, for example, can be a whole number in high resolution image width. The low-resolution image can then be converted to Lab Color space image. A binary image threshold can be applied on image L channel with a threshold detection technique, such as an Otsu Threshold technique. Resulted binary image dilation, erosion and blurring can then be performed on this converted image in order to remove noise and refine tissue boundaries.

As described above, a non-model-based algorithm can be used to perform pixel mask prediction. For example, geometrical and/or morphological procedures can be performed to refine inferences results, reduce false positives, and/or improve prevision of 10-high-power filed region location. In some non-limiting embodiments, mitotic figure instance segmentation can be performed by computing connected components of a given binary mask and labelling connected pixels with a unique integer label. In this way, pixels belonging to a specific candidate mitotic figure instance can receive a unique integer number. Abnormally small-sized mitotic figures, in certain non-limiting embodiments, can be excluded. A size of about 3 microns can be a minimal acceptable size along mitotic figure width. To utilize this minimum acceptable size, an algorithm can determine a rotated rectangle of a minimum area enclosing a mitotic figure mask's approximated contour. The width can then be measured as max(height, width) of the rotated rectangle. Appropriate mitotic figures can then be excluded. Mitotic figures in late stages of mitosis can then be counted. Mitotic figures at the late stages of mitosis can be double counted, for example, due to the small distance separating them during the mitosis process. To reduce such double counting, an algorithm can be executed to cause dilating the binary pixel mask with a number of repeated dilation iterations proportional to a kernel size and a mitotic cells inter-polar distance, so that mitotic figure instances within a given inter-polar distance can be counted as a single instance. The connected components can then be assigned unique mitotic figure identifications.

In certain non-limiting embodiments, a KD-tree based algorithm (or other machine learning algorithm) can be used to find the 10-high-power field with the highest count of mitotic figures. A 10-high-power field (10 HPF), which can be a square region for reporting mitotic count can be converted to pixel size using the WSI svs format (or other medical imaging file types). The square region, for example, can be a 2.37 mm² square region. To find the 10-high-power field with the greatest mitotic figure count, such as the given coordinates of mitotic figure centers, an algorithm can be performed within a range search, and in certain examples, the range can be 2-dimensional. The algorithm can be configured to find and count all mitotic figures within the 10-high-power field with a center at $\mathscr{C}$ wherein S can be a set of N points in $R^2$, and R can be a family of ranges in $R^2$, though other ranges are contemplated. The center can be represented using $\mathscr{C}_i$, $i \in [1, N]$, where N is the total number of detected mitotic figures. The algorithm, for example, can include building a KD-tree for a set of N 2-dimensional points (that is, the centers of all detected mitotic figures), with distance metric $\mathscr{L}$ norm (also known as Chebyshev's distance), such that the distance between 2 points P1 and P2 in 2-dimensional space is defined as $D_{Chebyshev}(P1, P2) = \max(|X_{P1}-X_{P2}|, |Y_{P1}-Y_{P2}|)$. A region in a space with Euclidean metric enclosed in a circle with radius r can then become a region enclosed in a square with side of 2*r under Chebyshev's distance. The algorithm can then query, for each point in the set of N 2-dimensional points, the tree for neighbors within radius $R=(HPF_{side})/2$, where $HPF_{side}$ represents a length of one side of the square 10 HPF region. The set of all possible 10HPF regions' corners can be a set derived from combination between X and Y coordinates of MF centers or as a cartesian product between MF centers' X and Y coordinates. In order to query points for $\mathscr{L}$ KD-tree search, all possible 10HPF regions corners can be converted to their centers by adding 10 HPF radius. For each proposed 10HPF center, the KD-tree built at step 1 can be queried for all neighbors in radius of 10HPF radius. The algorithm can then report the point with the maximum count of neighbors.

Figure 7:
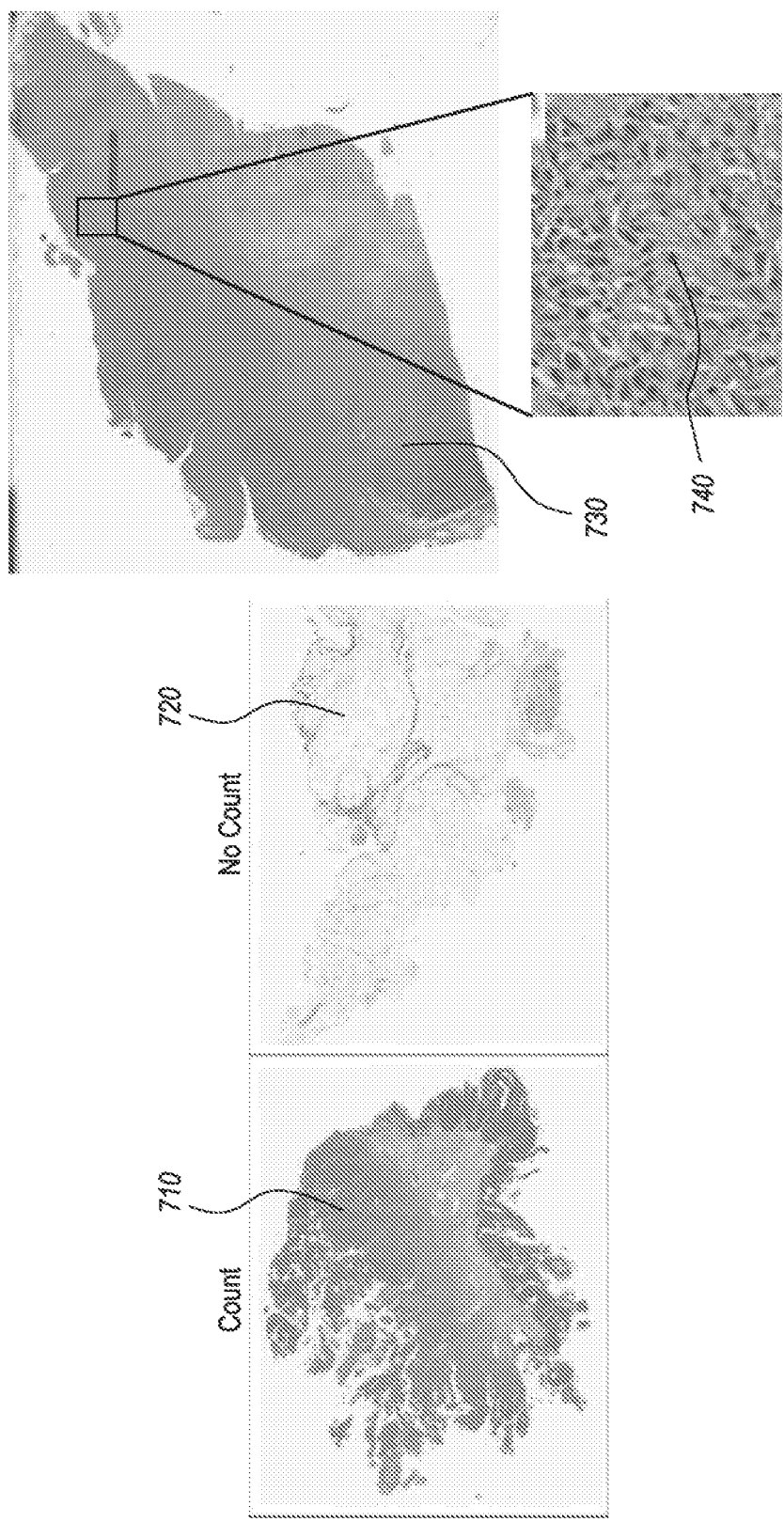
FIG. 7 illustrates an example biopsy slide classification according to certain non-limiting embodiments.

FIG. 7 illustrates an example biopsy slide classification result. A "count" slide 710 can indicate that the slide has a high likelihood to contain cancer based on image features detected during execution of a biopsy slide classification algorithm. A "no-count" slide 720 can indicate that no cancer was detected during execution of the biopsy slide classification algorithm. Further, this figure shows example slides that have been categorized as a "count" slide 710 and which have been edited into a fully annotated slide 730 to indicate mitotic figures 740. This annotation can be performed manually, as discussed above, or automatically by a machine learning (or artificial intelligence) algorithm. As can be seen in the zoomed in portion of the fully annotated slide 730 show an example identified mitotic FIG. 740.

Figure 8:
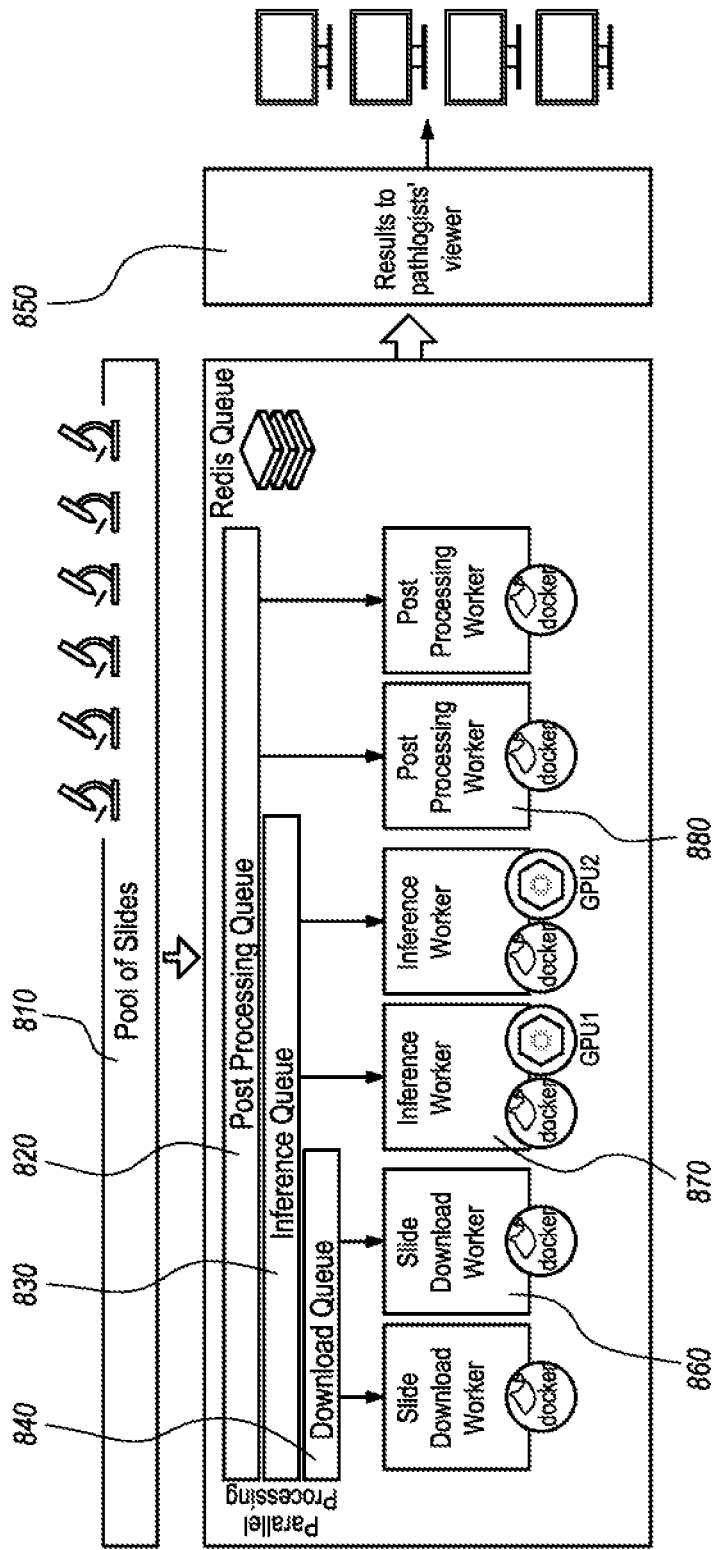
FIG. 8 illustrates an example of a deployed distribution architecture according to certain non-limiting embodiments.

FIG. 8 illustrates an example of a deployed distributed architecture for implementing certain non-limiting embodiments. A decentralized, asynchronous structure can include a variety of scalable blocks. These scalable blocks can include management programs, for example Python queue management programs. In further embodiments, the management programs can include Python "worker" programs, such as a download worker 860, an inference worker 870, and a post-processing worker 880. Download worker 860 can download a plurality of slides from a download queue 840, which receives slides from a network pool of slides 810. Download worker 860 can create a local buffer of slides, which can be accessible by inference worker 870, from an inference queue 830. Inference worker 870 can receive the slides and process them to extract mitotic figures. Such actions can be distributed to multiple inference workers 870 based on various factors, including, for example, graphics processing unit (QPU) availability. The post-processing worker 880 can then receive slides from a post-processing queue 820 and run post-processing steps, as set forth above, and provide final results to pathologist viewers 850. Each type of worker 860, 870, 880 can have its own queue 820, 830, 840. Each worker can include one or more docker containers, which each contain a separate bundle of software, libraries, and configuration files specific to their function.

According to certain non-limiting embodiments, the architecture illustrated in FIG. 8 can result in more accurate mitotic counts by utilizing a trained artificial intelligence than mitotic counts performed without a trained artificial intelligence. As can be seen in Table 1, below, the grade (i.e. rating) of mitotic figure counting can be improved by the use of artificial intelligence, over the results that can be achieved by observers (i.e. pathologists) without the use of any artificial intelligence. Even pathologists who are assisted with artificial intelligence can achieve better results than those who are unassisted.

TABLE 1

| Case # | Tumor Type | Non-AI assisted MC | AI-only MC | AI Assisted MC | Change in Grade |
|---|---|---|---|---|---|
| 3 | Mammary carcinoma (feline) | 30 | 129 | 117 | 2 → 3 |
| 13 | Mammary carcinoma (canine) | 11 | 34 | 25 | 1 → 2 |
| 28 | Mammary carcinoma (canine) | 8 | 17 | 13 | 2 → 3 |
| 32 | Mast cell tumor (canine) | 4 | 26 | 13 | Low → High |
| 7 | Soft tissue sarcoma (canine) | 3 | 15 | 11 | 1 → 2 |
| 39 | Soft tissue sarcoma (canine) | 3 | 90 | 69 | 2 → 3 |
| 40 | Soft tissue sarcoma (canine) | 3 | 63 | 43 | 2 → 3 |

For each method i (AI-Assisted, AI-Only and Non-Assisted) and each cancer type j (see Table 4 below), the mitotic count $y_{ij}$ can be modeled using a Poisson regression:

$$y_{ij} \sim \text{Poisson}(e^{\lambda_i + B_j}) \quad (2)$$

$$\beta_j \sim \text{student\_t}(3, 0, 2.5) \quad (3)$$

where the $\lambda_i$'s control for method used to find the mitotic count and $\beta_j$'s adjust for variation among cancer types. The coefficients $e^{\lambda_i}$ in Table 2 represent the relative mitotic count after controlling for cancer type:

TABLE 2

| AI Assistance | Relative mitotic count |
|---|---|
| Non-Assisted | 12.192 (9.650, 15.522) |
| Assisted | 35.835 (28.508, 45.404) |
| AI Only | 43.935 (34.917, 55.446) |

Figure 9:
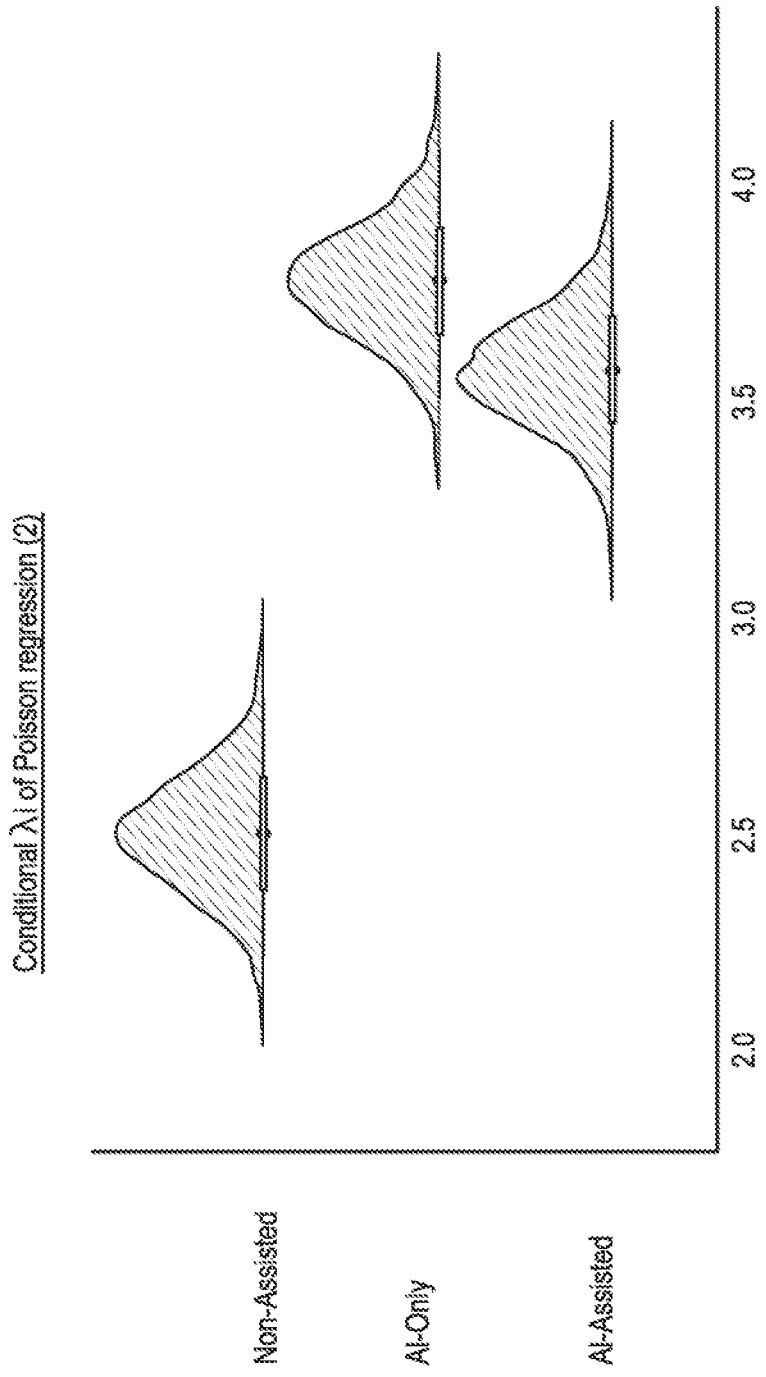
FIG. 9 illustrates Conditional $\lambda i$ of Poisson regression analysis according to certain non-limiting embodiments.

As depicted in FIG. 9, the full posteriors for the three main effects are displayed in on log-scale for readability purposes. The results show that such a system is deployable within the workflow and time constraints of a high throughput multi-site veterinary diagnostic pathology service, and that the automation of mitotic figure counting results in not only significant laboratory efficiency, but also improved accuracy in mitotic counting. Inference was performed on a daily average of 3,323 Whole Slide Imaged during the testing phase and scalability of the presented system indicates that growth in workload matched by the system's capabilities.

Figure 10:
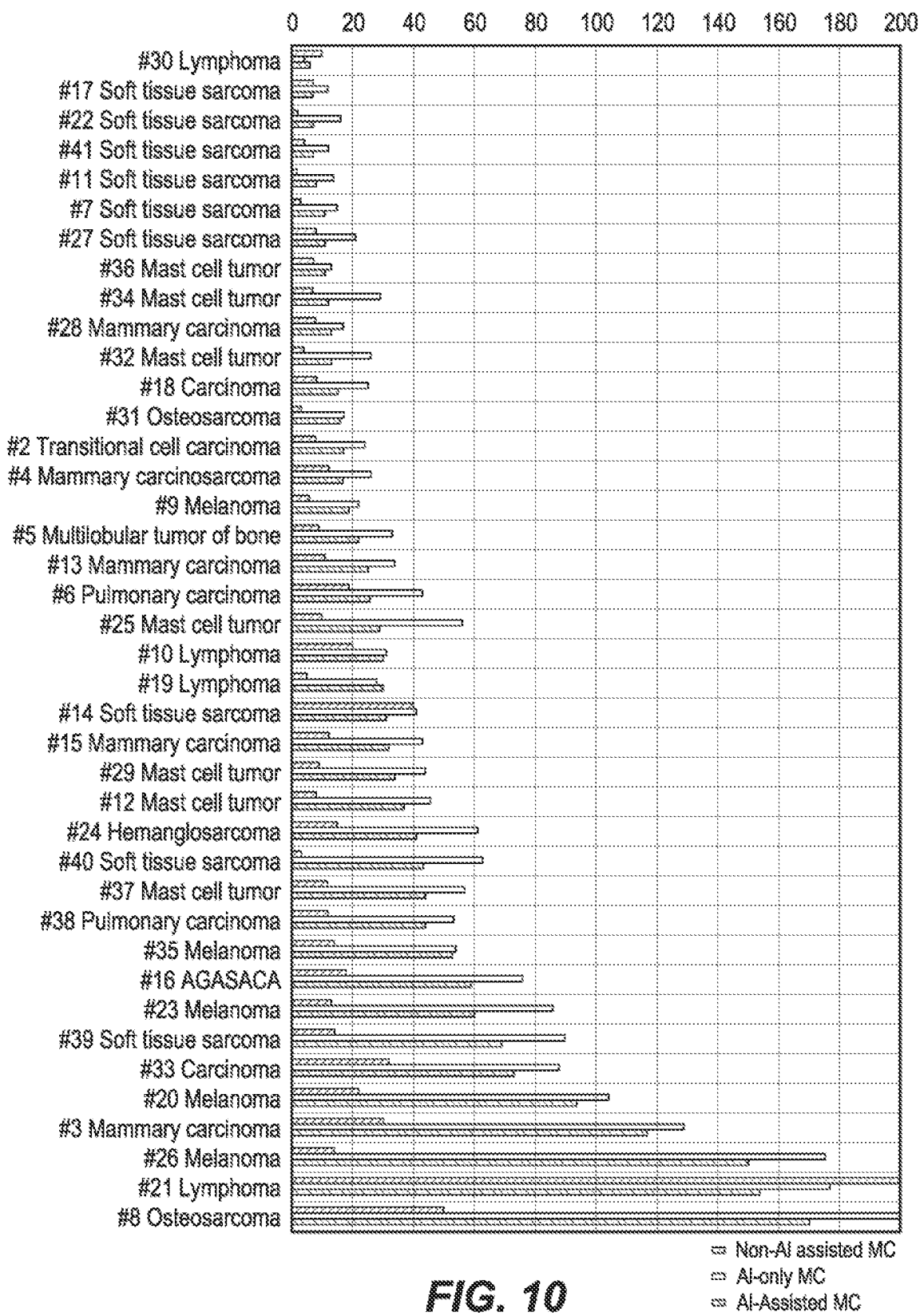
FIG. 10 illustrates the results of example mitotic counts performed without an artificial intelligence, with the assistance of an artificial intelligence, and with only an artificial intelligence.

FIG. 10 illustrates a chart showing example improvements in mitotic count accuracy of canine (C) and feline (F) neoplasia that can be achieved through the use and/or assistance of a trained artificial intelligence model, such as the one described herein. As can be seen, in most example studies, artificial intelligence only counts detected more mitotic figures than artificial intelligence-assisted counts and non-artificial intelligence-assisted (i.e. those done by an individual person) counts. The full results of these counts are shown in Table 3, below, which illustrates the results of a plurality of example tests showing improvements in certain embodiments, depending upon a number of factors, including, but not limited to, tumor type. "Up" and "Down" arrows indicate whether the AI-assisted MC average increased or decreased as compared to the Non-AI assisted MC by pathologist.

TABLE 3

| Case # | Tumor Type | Non-AI assisted MC by Pathologist #1 or #2 | AI-only MC | AI-Assisted MC by Pathologist #3 | AI-Assisted MC by Pathologist #4 | AI-Assisted MC average | Change Grade |
|---|---|---|---|---|---|---|---|
| 1 | Squamous cell carcinoma (F) | 12 | 59 | 34 | 48 | 41↑ | N/A |
| 1 | Squamous cell carcinoma (F) | | 50 | | | | |
| 2 | Transitional cell carcinoma (C) | 8 | 24 | 16 | 19 | 17↑ | N/A |
| 3 | Mammary carcinoma (F) | | 129 | 120 | 114 | 117↑ | Yes (2→3) |
| 3 | Mammary carcinoma (F) | 30 | 87 | | | | |
| 4 | Mammary carcinosarcoma (C) | 12 | 26 | 19 | 16 | 17↑ | N/A |
| 4 | Mammary carcinosarcoma (C) | | 24 | | | | |
| 5 | Multilobular tumor of bone (C) | 9 | 26 | | | | |
| 5 | Multilobular tumor of bone (C) | | 25 | | | | |
| 5 | Multilobular tumor of bone (C) | | 33 | 19 | 25 | 22↑ | No |

TABLE 3-continued

| Case # | Tumor Type | Non-AI assisted MC by Pathologist #1 or #2 | AI-only MC | AI-Assisted MC by Pathologist #3 | AI-Assisted MC by Pathologist #4 | AI-Assisted MC average | Change Grade |
|---|---|---|---|---|---|---|---|
| 6 | Pulmonary carcinoma (C) | | 43 | 25 | 27 | 26↑ | No |
| 6 | Pulmonary carcinoma (C) | 19 | 32 | | | | |
| 6 | Pulmonary carcinoma (C) | | 21 | | | | |
| 6 | Pulmonary carcinoma (C) | | 13 | | | | |
| 6 | Pulmonary carcinoma (C) | | 31 | | | | |
| 7 | Soft tissue sarcoma (C) | | 7 | | | | |
| 7 | Soft tissue sarcoma (C) | 3 | 15 | 10 | 13 | 11↑ | Yes (1→2) |
| 7 | Soft tissue sarcoma (C) | | 9 | | | | |
| 8 | Osteosarcoma (C) | | 203 | 180 | 160 | 170↑ | N/A |
| 8 | Osteosarcoma (C) | 50 | 96 | | | | |
| 8 | Osteosarcoma (C) | | 91 | | | | |
| 9 | Melanoma, oral (C) | 6 | 22 | 22 | 18 | 19↑ | No |
| 10 | Lymphoma, intestinal (F) | 20 | 31 | 27 | 34 | 30↑ | No |
| 10 | Lymphoma, intestinal (F) | | 19 | | | | |
| 10 | Lymphoma, intestinal (F) | | 19 | | | | |
| 11 | Soft tissue sarcoma (C) | | 14 | 9 | 8 | 8↑ | No |
| 11 | Soft tissue sarcoma (C) | 2 | 9 | | | | |
| 11 | Soft tissue sarcoma (C) | | 11 | | | | |
| 12 | Mast cell tumor (F) | 8 | 46 | 34 | 41 | 37↑ | No |
| 13 | Mammary carcinoma (C) | | 34 | 26 | 24 | 25↑ | Yes (1→2) |
| 13 | Mammary carcinoma (C) | 11 | 33 | | | | |
| 14 | Soft tissue sarcoma (F) | | 41 | 27 | 35 | 31↓ | No |
| 14 | Soft tissue sarcoma (F) | | 40 | | | | |
| 14 | Soft tissue sarcoma (F) | 40 | 25 | | | | |
| 14 | Soft tissue sarcoma (F) | | 33 | | | | |
| 15 | Mammary carcinoma (C) | 12 | 43 | 30 | 34 | 32↑ | No |
| 15 | Mammary carcinoma (C) | | 41 | | | | |
| 15 | Mammary carcinoma (C) | | 33 | | | | |
| 15 | Mammary carcinoma (C) | | 18 | | | | |
| 16 | Anal sac apocrine gland carcinoma(C) | 18 | 76 | 55 | 63 | 59↑ | N/A |
| 17 | Soft tissue sarcoma (C) | 7 | 12 | 7 | 8 | 7 | No |
| 17 | Soft tissue sarcoma (C) | | 11 | | | | |
| 17 | Soft tissue sarcoma (C) | | 5 | | | | |
| 17 | Soft tissue sarcoma (C) | | 3 | | | | |
| 17 | Soft tissue sarcoma (C) | | 3 | | | | |
| 18 | Carcinoma, nasal (C) | 8 | 25 | 16 | 14 | 15↑ | N/A |

TABLE 3-continued

| Case # | Tumor Type | Non-AI assisted MC by Pathologist #1 or #2 | AI-only MC | AI-Assisted MC by Pathologist #3 | AI-Assisted MC by Pathologist #4 | AI-Assisted MC average | Change Grade |
|---|---|---|---|---|---|---|---|
| 19 | Lymphoma, spleen (C) | 5 | 28 | 26 | 35 | 30↑ | No |
| 19 | Lymphoma, spleen (C) | | 24 | | | | |
| 19 | Lymphoma, spleen (C) | | 19 | | | | |
| 20 | Melanoma, digit (C) | | 104 | 96 | 93 | 94↑ | No |
| 20 | Melanoma, digit (C) | 22 | 94 | | | | |
| 21 | Lymphoma, skin (C) | 240 | 177 | 150 | 159 | 154↓ | No |
| 22 | Soft tissue sarcoma (C) | 2 | 16 | 6 | 9 | 7↑ | No |
| 22 | Soft tissue sarcoma (C) | | 10 | | | | |
| 22 | Soft tissue sarcoma (C) | | 7 | | | | |
| 22 | Soft tissue sarcoma (C) | | 8 | | | | |
| 23 | Melanoma, skin (C) | | 86 | $ 5 | 65 | 60↑ | No |
| 23 | Melanoma, skin (C) | 13 | 84 | | | | |
| 24 | Hemangiosarcoma, skin (C) | 15 | 61 | 37 | 45 | 41↑ | N/A |
| 25 | Mast cell tumor high/2 (C) | | 56 | 22 | 36 | 29↑ | No |
| 25 | Mast cell tumor high/2 (C) | 10 | 24 | | | | |
| 25 | Mast cell tumor high/2 (C) | | 15 | | | | |
| 26 | Melanoma, oral (C) | 14 | 175 | 162 | 139 | 150↑ | No |
| 26 | Melanoma, oral (C) | | 50 | | | | |
| 26 | Melanoma, oral (C) | | 109 | | | | |
| 27 | Soft tissue sarcoma (C) | 8 | 21 | 11 | 11 | 11↑ | No |
| 27 | Soft tissue sarcoma (C) | | 18 | | | | |
| 27 | Soft tissue sarcoma (C) | | 17 | | | | |
| 27 | Soft tissue sarcoma (C) | | 17 | | | | |
| 27 | Soft tissue sarcoma (C) | | 17 | | | | |
| 28 | Mammary carcinoma (C) | | 17 | 13 | 13 | 13↑ | Yes (2→3) |
| 28 | Mammary carcinoma (C) | | 14 | | | | |
| 28 | Mammary carcinoma (C) | | 11 | | | | |
| 28 | Mammary carcinoma (C) | 8 | 8 | | | | |
| 29 | Mast cell tumor high/subQ (C) | | 44 | 35 | 34 | 34↑ | No |
| 29 | Mast cell tumor high/subQ (C) | | 28 | | | | |
| 29 | Mast cell tumor high/subQ (C) | 9 | 9 | | | | |
| 30 | Lymphoma, nasal (F) | 10 | 4 | 7 | 6 | 6↓ | No |
| 31 | Osteosarcoma, spleen (C) | 3 | 17 | 18 | 14 | 16↑ | N/A |
| 31 | Osteosarcoma, spleen (C) | | 15 | | | | |
| 32 | Mast cell tumor low/2 (C) | | 26 | 10 | 16 | 13↑ | Yes (low→high) |

TABLE 3-continued

| Case # | Tumor Type | Non-AI assisted MC by Pathologist #1 or #2 | AI-only MC | AI-Assisted MC by Pathologist #3 | AI-Assisted MC by Pathologist #4 | AI-Assisted MC average | Change Grade |
|---|---|---|---|---|---|---|---|
| 32 | Mast cell tumor low/2 (C) | 4 | 25 | | | | |
| 32 | Mast cell tumor low/2 (C) | | 20 | | | | |
| 32 | Mast cell tumor low/2 (C) | | 18 | | | | |
| 33 | Carcinoma, mandibular (C) | 32 | 88 | 72 | 75 | 73↑ | N/A |
| 34 | Mast cell tumor high/2 (C) | 7 | 29 | 9 | 15 | 12↑ | No |
| 34 | Mast cell tumor high/2 (C) | | 13 | | | | |
| 34 | Mast cell tumor high/2 (C) | | 12 | | | | |
| 35 | Melanoma, skin (C) | | 54 | 52 | 54 | 53↑ | No |
| 35 | Melanoma, skin (C) | 14 | 29 | | | | |
| 36 | Mast cell tumor high/subQ (C) | | 13 | 10 | 12 | 11↑ | No |
| 36 | Mast cell tumor high/subQ (C) | 7 | 11 | | | | |
| 37 | Mast cell tumor high/3 (C) | 12 | 57 | 42 | 46 | 44↑ | No |
| 37 | Mast cell tumor high/3 (C) | | 21 | | | | |
| 37 | Mast cell tumor high/3 (C) | | 18 | | | | |
| 38 | Pulmonary carcinoma (C) | 12 | 53 | 45 | 43 | 44↑ | No |
| 38 | Pulmonary carcinoma (C) | | 37 | | | | |
| 38 | Pulmonary carcinoma (C) | | 34 | | | | |
| 39 | Soft tissue sarcoma (C) | | 90 | 67 | 72 | 69↑ | Yes (2→3) |
| 39 | Soft tissue sarcoma (C) | | 75 | | | | |
| 39 | Soft tissue sarcoma (C) | 14 | 70 | | | | |
| 39 | Soft tissue sarcoma (C) | | 68 | | | | |
| 40 | Soft tissue sarcoma (C) | 3 | 63 | 32 | 55 | 43↑ | Yes (2→3) |
| 40 | Soft tissue sarcoma (C) | | 37 | | | | |
| 40 | Soft tissue sarcoma (C) | | 36 | | | | |
| 40 | Soft tissue sarcoma (C) | | 35 | | | | |
| 40 | Soft tissue sarcoma (C) | | 17 | | | | |
| 41 | Soft tissue sarcoma (C) | | 12 | 6 | 8 | 7↑ | No |
| 41 | Soft tissue sarcoma (C) | | 9 | | | | |
| 41 | Soft tissue sarcoma (C) | 4 | 6 | | | | |

The systems and methods according to the present example embodiments provide improvements over previous methods. For example, as shown in Table 4, below, a KD-tree method, according to embodiments, can be more efficient (i.e., by saving time) compared to other brute-force techniques. These advantages are present regardless of the number of mitotic figures in the image, thus improving the art of mitotic figure counting.

TABLE 4

| | Algorithm 1 | | Algorithm 2, k-d tree | | Comparison | |
|---|---|---|---|---|---|---|
| | | | | | 10HPF | Net |
| | MF maxcount in 10HPF | Time (seconds) | MF maxcount in 10HPF | Time (seconds) | search time saving (%) | time saving (seconds) |
| min | 1 | 0.00 | 1 | 0.00 | N/A | 0.00 |
| 25th | 92 | 8.00 | 92 | 0.00 | 100.00% | 8.00 |
| 50th | 171 | 24.50 | 171 | 0.67 | 97.28% | 23.83 |
| 75th | 262 | 52.43 | 262 | 1.43 | 97.28% | 51.00 |
| max | 967 | 179.00 | 967 | 3.00 | 98.32% | 176.00 |

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein. "A and B" means "A and B, jointly or severally." unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates some non-limiting embodiments as providing particular advantages, certain non-limiting embodiments can provide none, some, or all of these advantages.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

The embodiments disclosed herein are only examples, and the scope of this disclosure is not limited to them. Certain non-limiting embodiments can include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed includes not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

As described above in connection with certain embodiments, certain components, e.g., computer system 500, can include a single computer or multiple computers, processor, network, mobile device, cluster, servers or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in permitting the system and method for displaying medical image records. For example, the presence of the computers, processors, memory, storage, and networking hardware provides the ability to display medical image records in a more efficient manner. Moreover, storing and saving the digital records cannot be accomplished with pen or paper, as such information is received over a network in electronic form.

The subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices).

The term processor encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA or an ASIC). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program can include, by way of example and not by way of limitation, both general and special purpose microprocessors. Devices suitable for storing computer program instructions and data can include all forms of non-volatile memory, media and memory devices, including by way of example but not by way of limitation, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Additionally, as described above in connection with certain embodiments, certain components can communicate with certain other components, for example via a network, e.g., a local area network or the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A computer-implemented method, comprising:
   receiving an image of a biopsy slide at a computing device;
   executing first programmed instructions to input the image of the biopsy slide to a first trained machine learning model programmed as a cancer classifier, thereby outputting a classification of the image of the biopsy slide;
   determining, based on the classification, that the image of the biopsy slide should be further processed;
   executing a tissue detection algorithm on the image of the biopsy slide, thereby outputting a first set of coordinates;
   executing second programmed instructions to input the image of the biopsy slide and the first set of coordinates to a second trained machine learning model programmed for image segmentation, thereby outputting a binary pixel mask;
   executing third programmed instructions to generate an enhanced pixel mask using the binary pixel mask; and
   digitally storing, in computer memory, a second set of coordinates indicated by the enhanced pixel mask.

2. The computer-implemented method of claim 1, further comprising:
   executing fourth programmed instructions implementing a KD-tree based algorithm to output a field with the most mitotic figures based on the enhanced pixel mask; and digitally storing the field in the computer memory in a file with the second set of coordinates.

3. The computer-implemented method of claim 2, wherein the field comprises a 10-high-power field.

4. The computer-implemented method of claim 2, further comprising displaying the field on a device display.

5. The computer-implemented method of claim 1, wherein the tissue detection algorithm comprises performing coarse tissue segmentation on a low-resolution view of the slide image of the biopsy.

6. The computer-implemented method of claim 1, the third programmed instructions being programmed to:
cause determining, for every connected set of coordinates of the binary pixel mask indicating a mitotic figure, a corresponding rotated rectangle, each rotated rectangle being of a minimum area enclosing an approximated contour of the mitotic figure; and
cause generating the enhanced pixel mask to include only coordinates associated with rotated rectangles having a respective width greater than a threshold width digitally stored in the computer memory.

7. The computer-implemented method of claim 6, the third programmed instructions being further programmed to cause dilating the binary pixel mask with a number of repeated dilation iterations proportional to a kernel size and a mitotic cells inter-polar distance stored in the computer memory.

8. The computer-implemented method of claim 1, wherein the second trained machine learning model comprises a convolutional neural network with skip-connections that was trained to minimize at least one of a balanced-cross-entropy (BCE) soft-Dice-Loss function or a soft-Dice-Loss function.

9. The computer-implemented method of claim 8, wherein the second trained machine learning model further comprises a U-Net model that was pre-trained with ImageNet.

10. The computer-implemented method of claim 1, wherein the image of the biopsy slide comprises an image of a biopsy of at least one of an animal or a pet, and wherein the image of the biopsy was generated using a medical imaging device, and wherein the image of the biopsy slide comprises a whole slide image (WSI).

11. The computer-implemented method of claim 1, further comprising displaying an output image comprising a representation of the image of the biopsy slide and the classification.

12. The computer-implemented method of claim 1, further comprising programmatically pre-processing the image of the biopsy slide, wherein said pre-processing comprises determining that image of the biopsy slide is clear enough for further processing.

13. The computer-implemented method of claim 12, wherein the image of the biopsy slide comprises a whole slide image, and wherein the pre-processing comprises at least one of determining that the resolution of the image of the biopsy slide exceeds a threshold resolution stored in the computer memory or determining that a number of slide images comprised by the whole slide image exceeds a threshold number stored in the computer memory.

14. The computer-implemented method of claim 1, further comprising:
programmatically calculating a mitotic figure count using the second set of coordinates; and
digitally storing the mitotic figure count in the computer memory.

15. The computer-implemented method of claim 1, wherein the computing device comprises a server computer, and wherein the image of the biopsy slide is received from a client computing device.

16. The computer-implemented method of claim 15, further comprising:
executing fourth programmed instructions implementing a KD-tree based algorithm to output a field with the most mitotic figures based on the enhanced pixel mask; and
digitally storing the field in the computer memory in a file with the second set of coordinates.

17. The computer-implemented method of claim 16, wherein the file comprises an extensible markup language (XML) file.

18. The computer-implemented method of claim 17, further comprising transmitting, from the server computer to the client computing device, information about the biopsy slide image as annotations that are rendered from the extensible markup language (XML) file.

19. The computer-implemented method of claim 1, further comprising executing the method using a distributed, decentralized, and asynchronous architecture comprising scalable blocks, the scalable blocks comprising management programs, and the management programs being implemented using docker containers.

20. A system comprising:
one or more processors; and
one or more computer-readable non-transitory storage media coupled to one or more of the processors and comprising instructions operable when executed by one or more of the processors to cause the system to perform operations comprising:
receiving an image of a biopsy slide;
executing first programmed instructions to input the image of the biopsy slide to a first trained machine learning model programmed as a cancer classifier, thereby outputting a classification of the image of the biopsy slide;
determining, based on the classification, that the image of the biopsy slide should be further processed;
executing a tissue detection algorithm on the image of the biopsy slide, thereby outputting a first set of coordinates;
executing second programmed instructions to input the image of the biopsy slide and the first set of coordinates to a second trained machine learning model programmed for image segmentation, thereby outputting a binary pixel mask;
executing third programmed instructions to generate an enhanced pixel mask using the binary pixel mask; and
digitally storing, in computer memory, a second set of coordinates indicated by the enhanced pixel mask.

* * * * *